United States Patent
Petersson et al.

(10) Patent No.: US 8,850,030 B2
(45) Date of Patent: Sep. 30, 2014

(54) METHOD AND APPARATUS FOR PROVIDING NETWORK RESOURCES TO CONTENT PROVIDERS

(75) Inventors: Justus Petersson, Stockholm (SE); Mona Matti, Nacka (SE)

(73) Assignee: Optis Wireless Technology, LLC, Plano, TX (US)

( * ) Notice: Subject to any disclaimer, the term of this patent is extended or adjusted under 35 U.S.C. 154(b) by 70 days.

(21) Appl. No.: 12/523,732

(22) PCT Filed: Jan. 26, 2007

(86) PCT No.: PCT/SE2007/000074
§ 371 (c)(1), (2), (4) Date: Jul. 19, 2009

(87) PCT Pub. No.: WO2008/091183
PCT Pub. Date: Jul. 31, 2008

(65) Prior Publication Data
US 2010/0049859 A1 Feb. 25, 2010

(51) Int. Cl.
*G06F 15/16* (2006.01)
*H04L 12/24* (2006.01)
*H04L 29/08* (2006.01)

(52) U.S. Cl.
CPC ........ *H04L 41/5003* (2013.01); *H04L 41/5006* (2013.01); *H04L 67/28* (2013.01); *H04L 67/34* (2013.01); *H04L 67/2838* (2013.01); *H04L 41/509* (2013.01); *H04L 67/04* (2013.01)
USPC ........................................................ 709/227

(58) Field of Classification Search
CPC . H04L 41/50; H04L 41/5003; H04L 41/5006; H04L 41/5019
USPC .................................................. 709/227, 229
See application file for complete search history.

(56) References Cited

U.S. PATENT DOCUMENTS 7,099,936 B2 * 8/2006 Chase et al. .................. 709/223
7,464,179 B2 * 12/2008 Hodges et al. ................ 709/238
(Continued)

FOREIGN PATENT DOCUMENTS

| JP | 2004-48662 A | 2/2004 |
| JP | 2006-99417 A | 4/2006 |
| WO | 2004/042573 A1 | 5/2004 |

OTHER PUBLICATIONS

Swedish Patent Office, Intl Search Report in PCT/SE2007/000074, Nov. 13, 2007.

*Primary Examiner* — Jason Recek
(74) *Attorney, Agent, or Firm* — Vincent J. Allen; James H. Ortega; Carstens & Cahoon, LLP

(57) ABSTRACT

A method and an SLA portal (204) in a communication network (202), for establishing an SLA (Service Level Agreement) between a third party content provider (200) and an operator of the network for ensuring network resources needed for delivering a specific service. When an SLA request (2:1) is received from the content provider for the service, at least one viable predetermined SLA is retrieved (2:2) from an SLA database (206) holding a plurality of predetermined SLAs. The retrieved at least one viable SLA is then sent (2:3) on offer to the content provider, optionally together with an assigned service identifier. Thereby, the process of establishing the SLA is automated and any physical meetings and correspondence otherwise can be avoided to save time and costs.

27 Claims, 3 Drawing Sheets

(56) References Cited

U.S. PATENT DOCUMENTS

| | | | |
|---|---|---|---|
| 7,623,457 B2* | 11/2009 | Hu | 370/235 |
| 8,131,831 B1* | 3/2012 | Hu | 709/223 |
| 2002/0177977 A1* | 11/2002 | Scarlat et al. | 702/186 |
| 2003/0061338 A1* | 3/2003 | Stelliga | 709/224 |
| 2004/0008688 A1 | 1/2004 | Matsubara et al. | |
| 2004/0064555 A1* | 4/2004 | Cuny et al. | 709/225 |
| 2005/0071182 A1* | 3/2005 | Aikens et al. | 705/1 |
| 2006/0171315 A1* | 8/2006 | Choi et al. | 370/230 |
| 2007/0033194 A1* | 2/2007 | Srinivas et al. | 707/10 |
| 2007/0094142 A1* | 4/2007 | Russell et al. | 705/52 |
| 2007/0117548 A1* | 5/2007 | Fernandez-Alonso et al. | 455/414.1 |
| 2007/0150936 A1* | 6/2007 | Maes | 726/1 |
| 2007/0180061 A1* | 8/2007 | Bantz et al. | 709/219 |
| 2008/0009265 A1* | 1/2008 | Fernandez-Alonso et al. | 455/411 |

* cited by examiner

METHOD AND APPARATUS FOR PROVIDING NETWORK RESOURCES TO CONTENT PROVIDERS

TECHNICAL FIELD

The present invention relates generally to a method and apparatus for providing network resources in a communication network to content providers, by establishing service level agreements between the content providers and the operator of said network.

BACKGROUND

Today, the market is growing rapidly for products and services that can be delivered electronically from content providers to terminal users. In this description, the term "content provider" represents a "third party" offering content delivered over communication networks as data in electronic digital form, such as information, images, audio and video content, etc., in any field of interest.

A content provider typically offers delivery of different products and services, in particular to mobile users according to certain parameters relating to the general Quality of Service (QoS), which is highly dependent on the available bandwidth, bitrate (or "throughput"), transfer delay and geographical coverage of the mobile network used. For example, a streaming service requires a certain guaranteed delivered bitrate to enable continuous decoding and presentation of the content at the receiving end-user without unacceptable delays or disturbances.

US 2004/0174823 A1 discloses a solution for using support level agreements (referred to as "SLAs") between "carriers" and "customers" i.e. end-users, defining terms of the carrier's responsibility to the customer with respect to availability, delay, throughput, customer service and cost.

In order to ensure that the offered QoS will be fulfilled at delivery of content to terminal users, a content provider may further establish a business agreement with the operator of a communication network, in the following description referred to as a "Service Level Agreement" SLA between the content provider and the network operator. An SLA generally dictates that the network operator should provide the network resources necessary for delivering content to end-users with the required and expected QoS. An SLA is typically tied to one or more specific services, such that a content provider may have plural SLAs with a network operator for different services.

Further, the network operator may also charge the end-users for any purchased content on behalf of the content providers, e.g. by means of regular subscription billing or pre-paid arrangements. The purchases of content can then be settled with the content providers according to suitable procedures, however lying outside the present invention. By closing such agreements with, e.g., major mobile network operators, the content providers are able to reach a greater customer segment than otherwise.

FIG. 1 is a simplified illustration of an arrangement where content providers 100 offer products and services for delivery of content to an end-user's mobile terminal A, requiring network resources from a mobile network operator 102. A first stage 1:1, generally illustrates that one or more service level agreements (SLA) are established between a content provider 100a and the operator 102, involving the storage of negotiated SLA parameters in a content provider (CP) database 104. Each SLA thus effectively guarantees a general Quality of Service (QoS) by ensuring the bandwidth, bitrate and geographical coverage needed for content delivery, as defined in the SLA.

The following stages in FIG. 1 illustrates a feasible procedure for enabling delivery of content from a content provider 100a to terminal A, using various well-known network nodes 104-110 of network operator 102. It is assumed that terminal A has already been authorised and obtained an IP connection from a gateway 106 in the operator's network, typically the GGSN (Gateway GPRS Switching Node).

An application function 108 in the operator's network is used for handling any requests from mobile users directed to third party content providers. Thus in a stage 1:2, application function 108 of operator 102 receives a content request from terminal A directed to an URL (Unified Resource Locator) associated with a specific service in content provider 100a. After the application function 108 has performed a mapping operation between the requested URL and identities of the content provider 100a and the invoked service, the request is further routed to a policy unit 110.

In a next stage 1:3, policy unit 110 performs a check in the CP database 104 whether any SLA is valid for the identified content provider/service combination. If so, a policy of that SLA is retrieved, basically dictating what network resources are to be allocated for delivery of the requested content to terminal A.

Policy unit 110 then accordingly installs the retrieved policy in the gateway 106 in a next stage 1:4, wherein the needed network resources are allocated in gateway 106, and the application function 108 is also notified. The procedure for installing the SLA policy and allocating network resources is not necessary to describe here in any detail to understand the concept of the present invention.

Thereafter, the application function 108 routes the service request received from terminal A to the content provider 100a, in a stage 1:5. In response thereto, the requested content is delivered from content provider 100a over the gateway 106 using the allocated network resources, in a last illustrated stage 1:6.

At present, establishing a service level agreement typically requires a negotiation between the content provider and the mobile network operator in order to settle different SLA parameters for the agreement in terms of, e.g., bitrate, bandwidth, transfer delay and geographical coverage. It is therefore often necessary that the two parties meet physically, or at least correspond extensively otherwise, in order to come to terms on the SLA. As mentioned above, a content provider offering plural services typically wants to establish an SLA with the network operator for each specific service since different services may need different network resources depending on the QoS requirements.

Hence, the activities involved in SLA establishment naturally becomes quite time-consuming, thus incurring great costs for both parties. Many minor content providers and others may therefore refrain from establishing SLAs, ultimately resulting in missed business opportunities for both parties. It is therefore desirable to generally reduce the efforts and time required for establishing an SLA between a content provider and a network operator.

The problems referred to above are not exclusively limited to mobile services and mobile networks but may also pertain to services in wire-based networks as well. However, SLAs are above all needed in mobile networks due to the limited bandwidth available for communication over the air.

SUMMARY

It is an object of the present invention to generally address the problems outlined above. More specifically, it is an object to provide a simple and fast yet effective mechanism for establishing an SLA (Service Level Agreement) between a network operator and a third party content provider.

These objects and others can be obtained by providing a method and apparatus according to the independent claims attached below.

According to one aspect, the present invention involves a method of establishing an SLA between a third party content provider and a communication network operator for ensuring network resources needed for a specific service or service type when delivered from the content provider to end-users.

In the inventive method, an SLA request is received from the content provider for the service at an SLA portal in the operator's network. At least one viable predetermined SLA is then retrieved from an SLA database holding a plurality of predetermined SLAs, and a service identifier is also assigned for the service. The at least one retrieved viable SLA is offered to the content provider, and an SLA selected by the content provider from the offered SLAs is established. The service identifier is then used for applying the established SLA whenever the service is delivered from the content provider to a requesting end-user.

According to different embodiments, the SLA portal also sends the assigned service identifier to the content provider, either with the at least one offered viable SLA or separately. Establishing the SLA may include that the SLA portal performs policy provisioning in a content provider database by referring to the service identifier, in response to an SLA establishment request from the content provider, or that the content provider itself performs the policy provisioning in the content provider database by referring to the service identifier.

If a URL or similar for the service was included in the SLA request, a binding between the service URL and the service identifier can be stored in an application function of the mobile operator or in a database accessible to the application function. The application function is adapted to process content requests from mobile users directed to that service URL.

Alternatively, the content provider, when receiving a request from an end-user directed to a URL or similar for the service, may map that URL with the service identifier and will also refer to the service identifier in a request for network resources for delivering the service.

The service parameters in a predetermined SLA can be specified as a framework with parameter intervals within which the content provider can set specific parameter values in a selected SLA. The predetermined SLAs in the SLA database can be configured with options including at least one of: alternative access mechanisms, charging mechanisms and subscription types. The predetermined SLAs can also be configured with default parameter settings and attributes, which when offered, the content provider is free to accept or change within given framework limits for a selected SLA.

According to another aspect, the present invention also involves an SLA portal in an operator's communication network, for establishing SLAs with third party content providers ensuring network resources needed for specific services or service types when delivered from the content providers to end-users.

The inventive SLA portal comprises means for receiving an SLA request from a content provider for a specific service or service type, means for retrieving at least one viable predetermined SLA from an SLA database, means for assigning a service identifier for the service, and means for sending the retrieved at least one viable SLA on offer to the content provider. The assigned service identifier is then used for applying an established SLA that has been selected by the content provider from the offered viable SLA(s), whenever the service is delivered from the content provider to a requesting end-user.

According to different embodiments, the SLA portal further comprises means for sending the service identifier to the content provider, either with the offered viable SLA(s) or separately. The SLA portal may also comprise means for establishing an SLA selected by the content provider from the offered ones, by performing policy provisioning in a content provider database referring to the assigned service identifier, in response to an SLA establishment request from the content provider.

The SLA portal may also comprise means for storing a binding between a service URL or similar for the service, included in the received SLA request, and the service identifier in an application function of the mobile operator or in a database accessible to the application function, where the application function is adapted to process content requests from mobile users directed to that service URL.

The SLA portal may further comprise means for sending the service identifier to the content provider, either with the retrieved viable SLA(s) or separately. The SLA portal may be adapted to also send an assigned content provider identifier with the service identifier to the content provider, wherein the content provider will be able to also include the content provider identifier in the network resource request. Alternatively, the assigned service identifier may be valid for the service combined with the content provider.

According to yet another aspect, the present invention also involves an arrangement in a content provider server, for establishing an SLA with a communication network operator for ensuring network resources needed for specific services or service types when delivered from the content provider to end-users.

The inventive arrangement in the content provider server comprises means for sending an SLA request for a specific service or service type to an SLA portal in the operator's communication network, means for receiving at least one viable predetermined SLA on offer from the SLA portal, means for also receiving a service identifier assigned for the service, means for mapping a URL or similar for the service with the service identifier, when received in a request from an end-user, and means for sending a request for network resources for delivering the service to the requesting end-user, referring to the service identifier.

The present invention makes it possible to generally reduce the efforts required when establishing service level agreements for specific service/content provider combinations with a network operator.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention introduces a new logic node in an operator's network that could be called a "service level agreement portal" or the like, hereafter referred to as the "SLA portal" for short. The SLA portal is configured to automatically deal with requests for service level agreements coming from content providers regarding specific services offered by said content providers, thereby eliminating the need for physical meetings and/or extensive correspondence between the two parties.

More specifically, the SLA portal is configured to offer one or more viable predefined service level agreements to a content provider in response to an SLA request therefrom. The requesting content provider can then select one of the offered service level agreements for a specific service or type of service, and thereby automatically establish the selected agreement for that service/service type with the network operator. Exemplary embodiments of the present invention will be described in more detail below. Even though a mobile network is mostly used for illustration in the following examples, the present invention is not limited thereto but can be used for wire-based networks as well.

Figure 1:
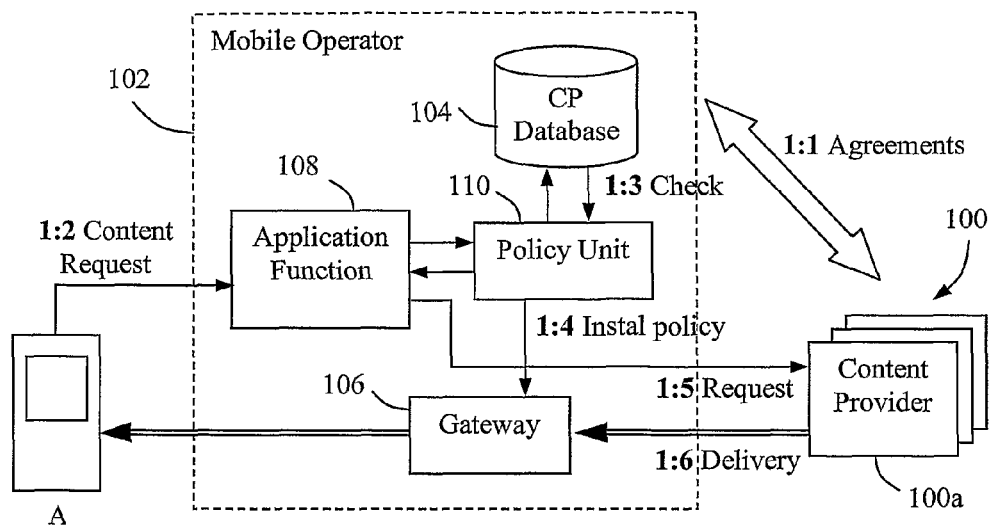
FIG. 1 is a block diagram illustrating content delivery from content providers to a mobile terminal over a mobile access network, according to the prior art.
Figure 2:
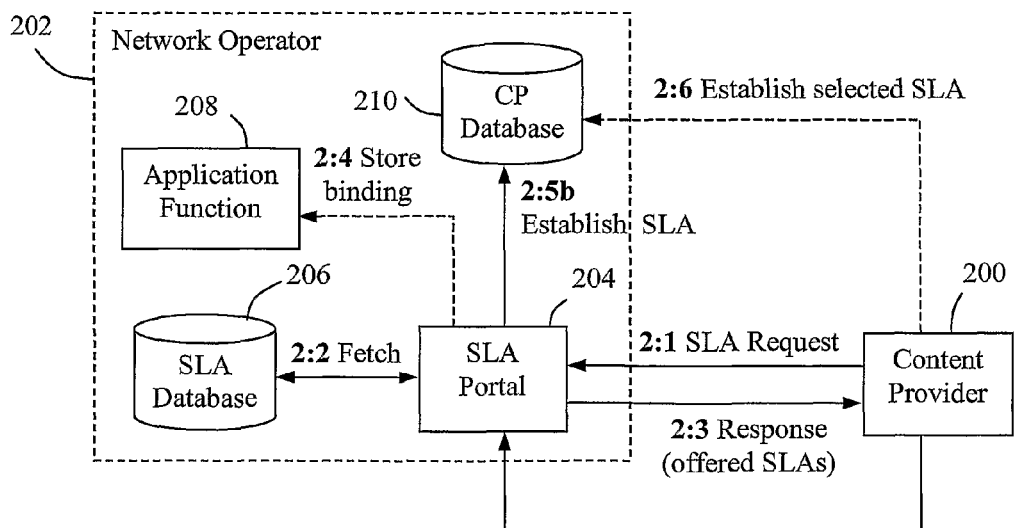
FIG. 2 is a block diagram illustrating how a service level agreement is established between a content provider and a network operator, according to one embodiment.

FIG. 2 is a block diagram illustrating a procedure and an arrangement for establishing a service level agreement between a content provider 200 and a network operator 202, according to one embodiment. It should be noted that after establishing an SLA according to FIG. 2, any content request from an end user's mobile terminal can be handled basically in accordance with FIG. 1. Thus, the inventive procedure of FIG. 2 can be used for basically implementing stage 1:1 referred to above for a content provider, to generally establish a service level agreement. Any actions taken by the content provider in the following may be implemented in a server or the like, numeral 200 thus representing a content provider server.

An SLA portal 204 is introduced in the network of the network operator 202, which includes or is connected to an SLA database 206 holding a plurality of predefined SLAs that the network operator is prepared to apply for different services and content providers. Thus, the SLA database 206 can be built up by composing and storing various SLAs, each containing a predetermined set of service parameters dictating network resources necessary for delivering content to end-users with a required and expected QoS related to a specific service or service type.

The service parameters in a predetermined SLA may be specified as a framework with parameter intervals within which the content provider can set specific parameter values during a policy provisioning process when establishing a selected SLA, which will be described in more detail below. A predetermined SLA may also comprise further attribute options such as alternative access mechanisms, charging mechanisms, subscription types, etc. The SLA portal 204 may be implemented as a specific node or as a functional logic in an existing network node, including any web portal that content providers can easily access over the Internet.

In a first step 2:1, the SLA portal 204 receives a request for an SLA from content provider 200 which may specify a service or service type for which an SLA is requested. Alternatively, the SLA portal 204 may obtain such service information by requesting the content provider 200 to enter such information in a form or the like during a separate dialogue, which is however outside the scope of the present invention. The SLA request of step 2:1 also contains a URL or similar pointer or indicator, being associated with the service. Today, the URL format is typically used for accessing services from content providers, which is also used in the embodiments described here although the present invention is not generally limited thereto.

In response to the SLA request, the SLA portal 204 fetches one or more predefined SLAs from database 206, in a step 2:2, that might be suitable for the given service or service type and/or requesting content provider 200. Preferably, a selection of viable SLAs are fetched that the operator is prepared to establish with the requesting content provider for the given service or service type. It should be noted that the SLA portal 204 can be equipped with a specific logic for determining which predefined SLAs stored in database 206 that are viable to both the network operator and the requesting content provider, however lying outside the scope of the present invention.

The SLA portal 204 also assigns at least an identifier $ID_S$ to the given service or service type and optionally also an identifier $ID_{CP}$ to the content provider, if not already assigned previously in a registration procedure that will be described in more detail below with reference to FIG. 4. Alternatively, a single service identifier can also be assigned for each specific combination of service and content provider. The above-mentioned identifiers assigned to the content provider and/or services are sometimes referred to as "credentials" of the content provider, being exclusively and safely associated with its content provider and services in the operator's network.

As a response to the SLA request received in step 2:1, SLA portal 204 offers the fetched viable SLAs to content provider 200, in a step 2:3. According to one alternative, the SLA portal 204 also stores a binding between the given service URL and the assigned identifier(s) $ID_S/(ID_{CP})$, in an application function 208 of the network operator 202, as illustrated in an optional step 2:4. In practice, the binding may be stored in a database or the like (not shown) accessible to the application function 208. Thereby, any subsequent request from an end-user for the service referring to that URL can be associated with the identifier(s) $ID_S/(ID_{CP})$ when received at the application function, e.g. involving a mapping operation between the requested URL and the identifier(s) as described for FIG. 1 above after stage 1:2. The corresponding SLA can then be applied accordingly when handling the service request.

According to another alternative, the SLA portal 204 sends the assigned identifier(s) $ID_S/(ID_{CP})$ to the content provider 200 together with the offered SLAs in step 2:3, or optionally in a separate step after receiving a response from the content provider selecting one of the offered SLAs. In this alternative, when receiving a subsequent request from an end-user referring to that URL, the content provider may be required to associate the URL with the previously received identifier(s) $ID_S/(ID_{CP})$ if no binding was stored by the SLA portal in step 2:4, and to specify those identifier(s) in a request for network resources such that the corresponding SLA can be applied accordingly when handling the service request.

However, at least an assigned service identifier should be sent to the content provider in any case, which the content provider must refer to when setting parameters and/or options selections in a selected SLA, if the selected SLA includes a framework of different options as described above. The SLA establishment involves storing SLA parameters and other settings in a content provider database 210 of the network operator 202, to be described in more detail below. This activity is referred to as "policy provisioning" and involves basically the setting of the amount of network resources the content provider will be more or less "guaranteed" whenever providing the service in question upon requests from end-users. The policy provisioning for a selected SLA may be carried out at any time after the SLAs have been offered to the content provider, by referring to the associated service identifier.

After receiving the offered SLAs in step 2:3, content provider 200 may generally select an SLA from the offered ones, for establishment with the network operator 202. The content provider 200 may then send a request for establishment of a selected SLA to SLA portal 204 in a first substep 2:5a, preferably including the assigned service identifier as a reference. The SLA portal 204 will then establish the selected SLA by policy provisioning in content provider database 210 in an alternative second substep 2:5b, preferably using the assigned service identifier as a reference. In practice, the SLA portal 204 may thus send a suitable policy provisioning message to content provider database 210 for the selected SLA, including the service identifier.

Depending on the implementation, the content provider may set specific parameter values and other attribute selections in the selected SLA, either directly in the establishment request of step 2:5a or in a dialogue or similar (not shown) with the SLA portal. Alternatively, content provider 200 may carry out the policy provisioning directly in the content provider database 210 to establish a selected SLA, as illustrated by a final step 2:6. In practice, the content provider 200 may then send a suitable policy provisioning message to content provider database 210 for the selected SLA, including the service identifier. The assigned service identifier is thus preferably used as a reference in the policy provisioning of either step 2:5b or step 2:6 above.

According to yet another alternative, content provider 200 may select an SLA having default parameters, thus not requiring any setting of specific parameter values and other selections therein. In this case, no policy provisioning as described above is needed in steps 2:5a,b or 2:6, apart from the mere selection of the SLA. Depending on the implementation, the SLAs in database 206 may be configured with default parameter settings and other attributes, which when offered, the content provider is free to accept or change within given framework limits.

In this way, the process of establishing an SLA for a specific service or service type between a content provider and a network operator can be wholly automated, thus requiring no physical meetings or correspondence otherwise between the involved parties 200, 202. Instead, the SLA portal 204 is configured to automatically fetch any number of viable predefined SLAs from the SLA database 206 in step 2:2 above, based on the content provider and service or service type given in the SLA request of step 2:1 or otherwise, for offer in step 2:3. It is a further advantage that the process of establishing an SLA in this way becomes altogether "neutral", and any potentially awkward meetings "face-to-face" or manual correspondence otherwise can thus be completely avoided.

As suggested above, the described procedure of FIG. 2 can be modified in multiple different ways, e.g. as regards at which point each measure, step, message can be executed, being subject to implementation.

Figure 3:
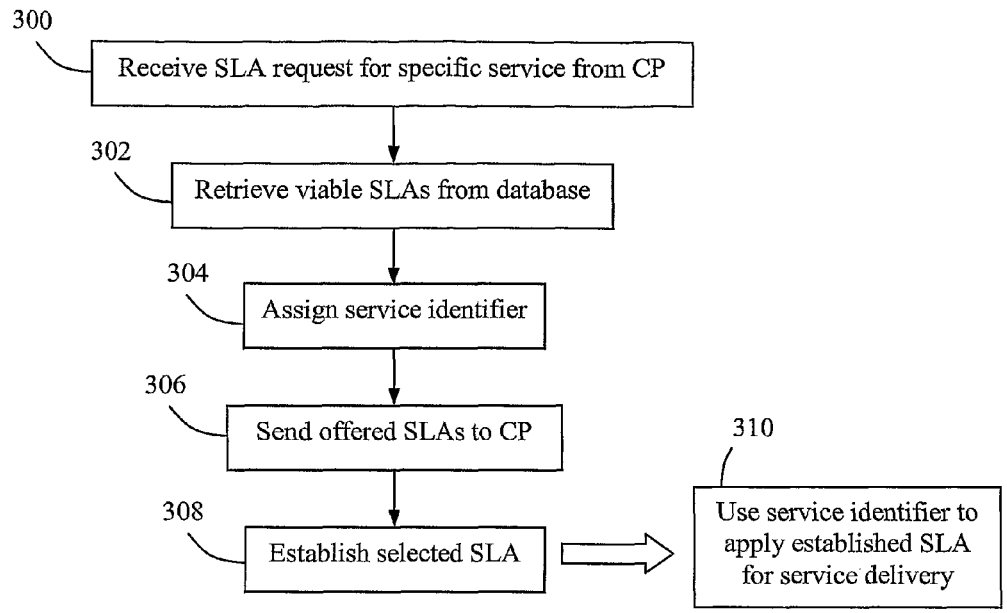
FIG. 3 is a flow chart illustrating a procedure for establishing a service level agreement with a content provider, involving an SLA portal of a network operator, according to another embodiment.

FIG. 3 is a flow chart of a procedure in another embodiment for establishing a service level agreement between a content provider and a network operator, chiefly using an SLA portal in an operator's communication network. The procedure of FIG. 3 basically corresponds to the arrangement illustrated in FIG. 2 as indicated below.

In a first step 300, the SLA portal receives an SLA request for a specific service or service type including an associated service URL or similar, from a content provider CP (which basically corresponds to step 2:1 in FIG. 2). Depending on the implementation, the content provider may have registered with the SLA portal prior to step 300 and obtained a content provider identifier. In a next step 302, the SLA portal retrieves at least one feasible or viable predefined SLA from an SLA database, based on the requesting content provider and service or service type given in the SLA request (which basically corresponds to step 2:1 in FIG. 2).

Thereafter, the SLA portal assigns an identifier to the given service or service type in a next step 304, and sends the retrieved SLAs as offered SLAs to the requesting content provider in a following step 306 (basically corresponding to step 2:3 in FIG. 2). Next, the SLA portal may store a binding between the service URL and the assigned service identifier in an application function or similar, which is not illustrated here as a step (although basically corresponding to step 2:4 in FIG. 2). As mentioned above, the binding may also include an identifier assigned to the requesting content provider. Preferably, the SLA portal also sends the assigned service identifier to the content provider, either with the offered SLAs in step 306 or separately (not shown), to be used as a reference when the content provider selects an SLA and/or when requesting for network resources for service delivery.

As further mentioned above when describing FIG. 2, the SLA portal is not required to store the binding in the application function, if the content provider is made responsible for associating the URL of an incoming end-user request with the received service identifier, to specify that identifier in a request for network resources for service delivery to the end-user.

The next step 308 generally represents the establishment of an SLA selected by the content provider amongst the SLAs offered in step 304, which step can be performed either by the content provider or the SLA portal by referring to the assigned service identifier (basically corresponding to step 2:5 or 2:5b in FIG. 2, respectively). In this step, a policy for the selected SLA is provisioned in a content provider database or the like, such as the CP database 210 shown in FIG. 2.

Finally, after establishment of the SLA, the assigned service identifier can be used, in a step 310, for applying the established SLA whenever the corresponding service is delivered from the content provider to a requesting end-user. Thus, a requested URL can be associated with the assigned service identifier, either by the application function or by the content provider, as described above.

A more detailed signaling procedure according to another exemplary embodiment for establishing a service level agreement for a content provider will now be described with reference to FIG. 4, which can be used for implementing the present invention in a mobile operator's network. The figure illustrates the content provider 400 and involved network nodes in the network, including an SLA portal 402 connected to an SLA database 402a, a content provider database 404 connected to a policy unit 404a, and an application function node 406.

In this embodiment, the content provider 400 may initially register with the SLA portal 402 before requesting any SLAs for specific services or service types. Thus, in a first step 4:1, the SLA portal 402 receives a registration request from content provider 400. A next step 4:2 generally illustrates that SLA portal 402 establishes the requested registration for content provider 400, which may involve controlling its credibility and/or a credit, as well as assigning a general identifier $ID_{CP}$ for the content provider 400 that is also stored in a local database or the like (not shown). A registration response is then sent back to the content provider 400 in a step 4:3, including the assigned identifier $ID_{CP}$.

At some point thereafter, the content provider sends an SLA request to SLA portal 402 in a step 4:4 for a specific service or service type, including the previously assigned general content provider identifier $ID_{CP}$ as well as a URL associated with the specific service or service type. Preferably, the SLA request also includes a service description or general service identification which can be understood by the SLA portal. Otherwise, this information can be provided in a separate service dialogue as mention above.

In a next step 4:5, SLA portal 402 retrieves at least one viable predefined SLA from the SLA database 402a, based on the content provider's identifier $ID_{CP}$ and the service or service type being somehow indicated in connection with the SLA request. In this step, a service identifier $ID_S$ is also assigned to the service or service type indicated in the SLA request. Thereafter, SLA portal 402 sends the at least one retrieved SLA to content provider 400 as at least one offered SLA, along with the assigned service identifier $ID_S$, in a further step 4:6. Alternatively, as mentioned above, the service identifier $ID_S$ may be sent to content provider 400 in a later step, e.g. after receiving a response indicating a selected SLA therefrom, although not shown in this example.

In a following step 4:7, the SLA portal 402 also stores a binding in the application function 406 between the URL in the SLA request and the assigned service identifier $ID_S$ as well as the previously assigned content provider identifier $ID_{CP}$. As mentioned above for FIG. 2, the binding may be stored in a database or the like accessible to the application function 406, where that database may be shared by plural application functions. Thereby, any subsequent content request from a mobile user directed to that URL reaching the application function 406, will be recognised as being associated with that combination of service identifier $ID_S$ and content provider identifier $ID_{CP}$, and will be processed accordingly.

Finally, the content provider 400, having chosen an SLA among the offered SLAs, establishes a policy in the CP database 404 for the selected SLA combined with the service identifier $ID_S$, and with the content provider identifier $ID_{CP}$ as well, if used. As in steps 2:5a and 2:5b of FIG. 2, respectively, the content provider may send an SLA establishment request to SLA portal 402, including the assigned service identifier $ID_S$ as a reference, instructing the SLA portal to execute the provision of the SLA policy in CP database 404, as illustrated by the two arrows of a step 4:8. Alternatively, as in step 2:6 of FIG. 2, the content provider may itself execute the provision of the SLA policy in CP database 404 likewise referring to the service identifier $ID_S$, as illustrated by an alternative step 4:8a.

After the SLA has been established and stored in the CP database 404 as a policy, the content provider 400 is able to request for network resources from the policy unit 404a whenever content is to be delivered to a content requesting mobile user. The content provider 400 should also refer to identifiers $ID_S$ and $ID_{CP}$ in the network resource request.

The policy unit 404a will then be able to authenticate the content provider 400 based on the content provider identifier $ID_{CP}$. The policy unit 404a will also check the SLA policy stored in CP database 404, for determining what network resources the content provider 400 is entitled to in terms of bandwidth, bitrate, transfer delay, geographical coverage, or any other communication parameters influencing the QoS. If necessary, details of the established SLA may be retrieved from the SLA database 402a, if not already stored in the CP database 404. Relevant network resources are then allocated to the content delivery according to the prevailing SLA.

The process of establishing an SLA for a specific service or service type according to steps 4:4-4:8 can of course be repeated for any service for which the content provider 400 wants to ensure safe delivery whilst fulfilling the expected QoS. Thus, a content provider may end up with having a plurality of different SLAs adapted for different services or service types.

As mentioned above, a single service identifier can be assigned for each specific combination of service and content provider, and in that case it is not necessary for the content provider to register with the SLA portal 402 prior to making an SLA request to obtain a separate content provider identifier. The above-described steps 4:1-4:3 can thus be considered optional and dependent on the implementation, provided that any authorisation and authentication of the content provider can be made upon the SLA request.

Figure 4:
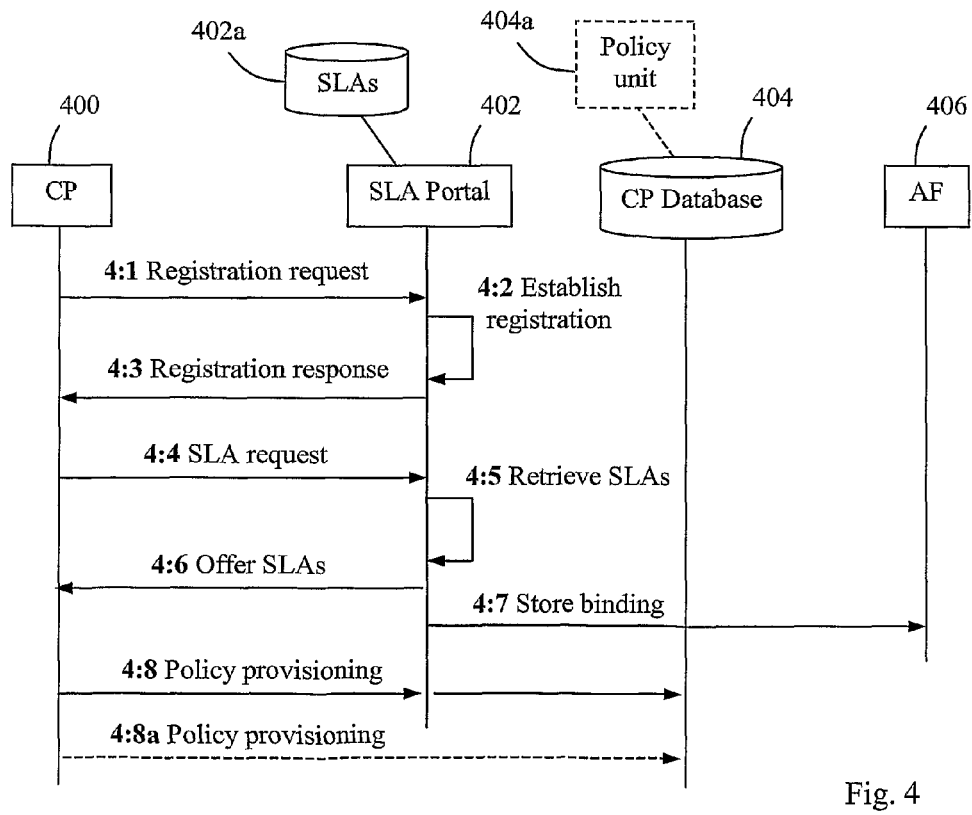
FIG. 4 is a signaling diagram illustrating the establishment of a service level agreement between a content provider and a network operator, according to yet another embodiment.
Figure 5:
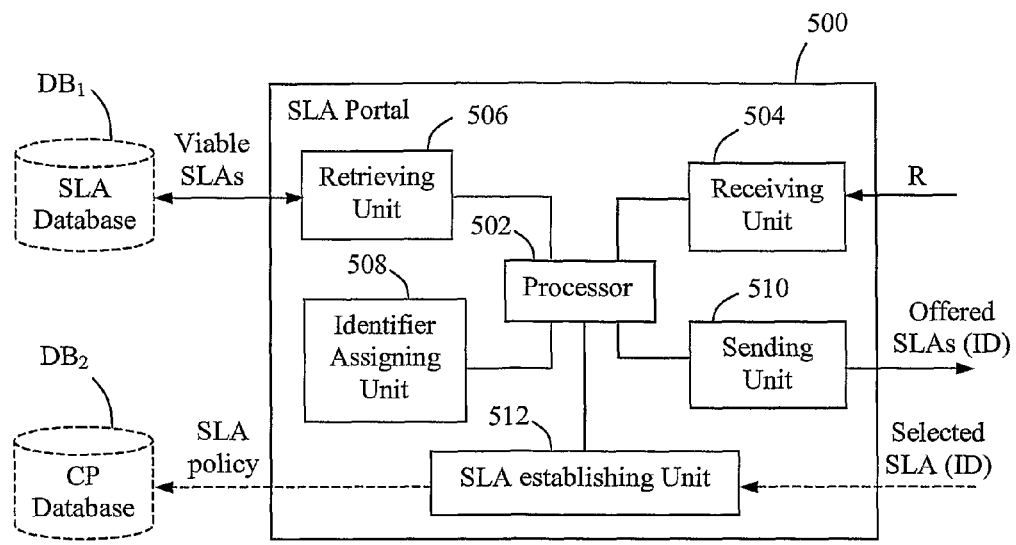
FIG. 5 is a block diagram illustrating an SLA portal of a network operator adapted to establish service level agreements with content providers, according to yet another embodiment.

FIG. 5 illustrates in more detail an SLA portal 500 in an operators communication network, such as the SLA portal 204 shown in FIG. 2, or the SLA portal 402 shown in FIG. 4. The SLA portal 500 is adapted to establish SLAs with third party content providers (not shown) for ensuring network resources needed for specific services or service types when delivered from the content provider to end-users. SLA portal 500 comprises the following functional units 502-512, which should be understood in a purely logic sense. Thus, units 502-512 can be implemented in any practical manner by a skilled person, using suitable hardware and software.

A central processor 502 is shown that coordinates the different functions of the other units in the SLA portal 500, although the processor 502 may otherwise be distributed in the individual units 504-512.

A receiving unit 504 is adapted to receive an SLA request R from a content provider (not shown) for a specific service or service type.

A retrieving unit 506 is adapted to retrieve viable predetermined SLAs from an SLA database $DB_1$ holding a plurality of predetermined SLAs, such as the database 206 shown in FIG. 2.

An identifier assigning unit 508 is adapted to assigning a service identifier for a service or service type of said SLA request R.

A sending unit 510 is adapted to send the retrieved viable SLAs on offer to the content provider, and to also send the assigned service identifier either with the offered SLAs or separately.

Finally, an SLA establishing unit 512 is adapted to establish an SLA on behalf of the content provider, in response to a request for establishment of a selected SLA therefrom referring to the assigned service identifier, by policy provisioning in a content provider database $DB_2$ in the operator's network, such as the database 210 shown in FIG. 2. The SLA portal 500 may further comprise functionality (not shown) for storing a binding between a URL of the service and the assigned service identifier, in an application function of the mobile operator or in a database accessible to the application function.

Figure 6:
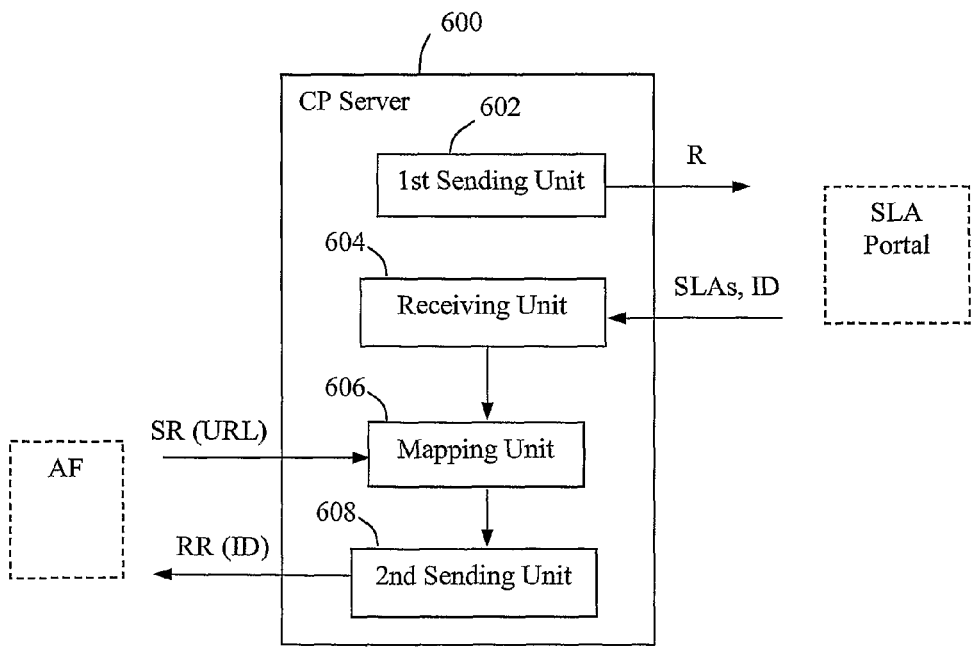
FIG. 6 is a block diagram illustrating a content provider server adapted to establish service level agreements with network operators, according to yet another embodiment.

FIG. 6 illustrates in more detail a content provider server 600, acting basically as the content provider 200 shown in FIG. 2 or the content provider 400 shown in FIG. 4. The content provider server 600 is adapted to establish an SLA with a communication network operator, for ensuring network resources needed for specific services or service types when delivered from the content provider to end-users. Content provider server 600 comprises the following functional units 602-608, which again should be understood in a purely logic sense. Thus, units 602-608 can be implemented in any practical manner by a skilled person, using suitable hardware and software.

A first sending unit 602 is adapted to send an SLA request R for a specific service or service type to an SLA portal in the operator's communication network.

A receiving unit 604 is adapted to receive viable predetermined SLAs on offer from the SLA portal and retrieved from an SLA database holding a plurality of predetermined SLAs, in response to said SLA request R. Receiving unit 604 is further adapted to receive a service identifier ID from the SLA portal assigned for said service or service type.

A mapping unit 606 is adapted to map a URL or similar for said service or service type, when received in a service request SR from an end-user, with said service identifier ID. The content provider 600 typically receives any service request SR via an application function AF, e.g. as in step 1:4 of FIG. 1.

Finally, a second sending unit 608 is adapted to send a request RR to the application function AF for network resources for delivering said service to the requesting end-user, where said resource request refers to the service identifier ID.

Significant advantages may be obtained when using the present invention, as exemplified below.

1) The process of establishing an SLA becomes neutral by offering viable predefined SLAs as selected for the content provider and the service concerned.

2) Substantial amounts of time and effort can be saved since no personal meetings or manual correspondence otherwise are basically necessary for SLA negotiations.

3) Mobile operators will be able to establish SLAs with numerous third party content providers with a minimum of administrative work, and of course the process is facilitated also for the content providers.

4) Different content providers may have very different requirements regarding how much and what type of network resources are needed for different services or service types, e.g. services for streaming, messaging, positioning, charging, etc., as well as bandwidth and coverage. It is therefore a great advantage that any number of different service profiles can be satisfied by freely composing any predefined SLAs for offer.

While the invention has been described with reference to specific exemplary embodiments, the description is in general only intended to illustrate the inventive concept and should not be taken as limiting the scope of the invention. For example, the SIP signaling protocol and IMS concept have been used throughout when describing the above embodiments, although any other standards and service networks may basically be used. The present invention is defined by the appended claims.

The invention claimed is:

1. A method performed by an SLA portal in a communication network for establishing a Service Level Agreement (SLA) between a third-party content provider and a communication network operator for ensuring network resources needed for future delivery of a service or service type from the third-party content provider to end-users via the communication network, the method comprising:

receiving an SLA request specifying the service or service type, from the third-party content provider, at the SLA portal;

retrieving at least one viable predetermined SLA from an SLA database holding a plurality of predetermined SLAs usable to establish SLAs, the at least one viable predetermined SLA ensuring network resources for the future delivery of the service or service type;

assigning a service identifier for identifying the service or service type specified in the SLA request;

offering the at least one retrieved viable SLA to the third-party content provider;

establishing a selected SLA upon receiving from the third-party content provider an indication as to which among the at least one offered viable SLA is selected by the third-party content provider; and providing the assigned service identifier to the third-party content provider, wherein the assigned service identifier is received from the third-party content provider for applying the established SLA each time the service or service type will be delivered via the communication network from the content provider to a requesting end-user.

2. The method of claim 1, wherein establishing the SLA includes performing, by the SLA portal, policy provisioning in a content provider database by referring to the assigned service identifier in response to an SLA establishment request from the third-party content provider.

3. The method of claim 1, wherein establishing the SLA includes performing, by the third-party content provider, policy provisioning in a content provider database by referring to a received assigned service identifier.

4. The method of claim 1, wherein a resource locator for the service or service type is included in a received SLA request, and the method further comprises storing a binding between the resource locator and the assigned service identifier in an application function of the communication network operator or in a database accessible to the application function, the application function being adapted to process content requests from end-users directed to the resource locator.

5. The method of claim 4, wherein an assigned content provider identifier is included in the binding.

6. The method of claim 1, wherein the third-party content provider, upon receiving a request from an end-user directed to a resource locator for the service or service type, maps that resource locator with the service identifier and refers to the service identifier in a request for network resources for delivering the service or service type.

7. The method of claim 6, wherein an assigned content provider identifier is sent with the assigned service identifier to the third-party content provider, and the third-party content provider includes the content provider identifier in the network resource request.

8. The method of claim 7, further comprising receiving a registration request from the third-party content provider prior to the SLA request, and establishing the requested registration for content provider by assigning the content provider identifier, and sending a registration response back to the third-party content provider including the content provider identifier.

9. The method of claim 8, wherein establishing the requested registration includes controlling a credibility or a credit of the content provider.

10. The method of claim 1, wherein service parameters in a predetermined SLA are specified as a framework with parameter intervals within which the third-party content provider can set parameter values in a selected SLA.

11. The method of claim 10, wherein predetermined SLAs in the SLA database are configured with default parameter settings and attributes, which when offered, the third-party content provider can accept or change within given framework limits for a selected SLA.

12. The method of claim 1, wherein predetermined SLAs in the SLA database are configured with options that include at least one of alternative access mechanisms, charging mechanisms, and subscription types.

13. The method of claim 1, wherein the at least one viable predetermined SLA is retrieved from the SLA database based on the third-party content provider and service or service type given in the received SLA request.

14. A Service Level Agreement (SLA) portal in an operator's communication network for establishing SLAs with third-party content providers ensuring network resources needed for services or service types when delivered from the third-party content providers to end-users via the communication network, the SLA portal comprising:
   a receiver configured to receive an SLA request specifying a service or service type, from a third-party content provider;
   a device configured to retrieve at least one viable predetermined SLA from an SLA database holding a plurality of predetermined SLAs usable to establish SLAs, the at least one viable predetermined SLA ensuring network resources for future delivery of the service or service type;
   a device configured to assign a service identifier for identifying the service or service type specified in the SLA request; and
   a first transmitter configured to send the retrieved at least one viable SLA to the third-party content provider; and
   a device configured to establish a selected SLA upon receiving an indication regarding an SLA selected by the third-party content provider from the at least one offered viable SLA,
   wherein the first transmitter is further configured to provide the assigned service identifier to the third-party content provider, wherein the receiver is further configured to receive assigned service identifier from the third-party content provider for applying the established SLA each time the service or service type will be delivered via the communication network from the third-party content provider to a requesting end-user.

15. The SLA portal of claim 14, further comprising a device configured to establish an SLA selected by the third-party content provider from the at least one offered viable SLA by performing policy provisioning in a content provider database referring to the assigned service identifier in response to an SLA establishment request from the content provider.

16. The SLA portal of claim 14, wherein a resource locator for the service or service type is included in a received SLA request, and the SLA portal further comprises a memory configured to store a binding between the service's resource locator and the assigned service identifier in an application function of the communication network operator or in a database accessible to the application function, the application function being adapted to process content requests from end-users directed to the service's resource locator.

17. The SLA portal of claim 16, wherein an assigned content provider identifier is included in the binding.

18. The SLA portal of claim 16, wherein the SLA portal is configured to receive a registration request from the content provider prior to the SLA request, to establish the requested registration for the third-party content provider by assigning the content provider identifier, and to send a registration response back to the third-party content provider that includes the content provider identifier.

19. The SLA portal of claim 18, wherein establishing the requested registration includes controlling a credibility or credit of the third-party content provider.

20. The SLA portal of claim 14, further comprising a transmitter configured to send the assigned service identifier to the content provider, such that the content provider, upon receiving a request from an end-user directed to a resource locator for the service or service type, is enabled to map that resource locator with the service identifier and refer to the service identifier in a request for network resources for delivering the service or service type.

21. The SLA portal of claim 20, wherein the transmitter is also configured to send an assigned content provider identifier with the assigned service identifier to the third-party content provider, whereby the third-party content provider is enabled to include the content provider identifier in the network resource request.

22. The SLA portal of claim 14, wherein the device configured to retrieve is configured to retrieve the at least one viable predetermined SLA from the SLA database based on the third-party content provider and service or service type given in the received SLA request.

23. An arrangement in a content provider server for establishing a Service Level Agreement (SLA) with a communication network operator for ensuring network resources needed for services or service types when delivered from the content provider to end-users via the communication network, the arrangement comprising:
   a transmitter configured to send an SLA request specifying a service or service type to an SLA portal in the operator's communication network;
   a receiver configured to receive at least one viable predetermined SLA from the SLA portal, the at least one viable predetermined SLA ensuring network resources for future delivery of the service or service type, wherein the transmitter is further configured to send a selection of an SLA from the received at least one viable predetermined SLA;
   a receiver configured to receive a service identifier from the SLA portal, the service identifier having been assigned for identifying the service or service type specified in the SLA request and used for applying the selected SLA each time the service or service type will be delivered via the communication network from the content provider to an end-user;
   a mapper configured to map a resource locator for the service or service type, when a request for the service or service type is received from an end-user; and
   a transmitter configured to send a request for network resources for delivering the requested service or service type to the end-user via the communication network, the network resource request referring to the service identifier such that the selected SLA applies when the requested service or service type is delivered to the requesting end-user via the communication network.

24. The arrangement of claim 23, further comprising a receiver configured to receive an assigned content provider identifier identifying the content provider along with the received assigned service identifier, wherein the network resource request further includes the content provider identifier.

25. The arrangement of claim 23, wherein service parameters in the received at least one viable predetermined SLA are specified as a framework with parameter intervals within which the content provider can set parameter values in a selected SLA.

26. The arrangement of claim 25, wherein the received at least one viable predetermined SLA is configured with default parameter settings and attributes, which when received, the content provider can accept or change within given framework limits for a selected SLA.

27. The arrangement of claim 23, wherein the received at least one viable predetermined SLA is configured with options that include at least one of alternative access mechanisms, charging mechanisms, and subscription types.

* * * * *